June 2, 1964 T. B. BROWN 3,135,199
MAGNETOMETER

Filed Aug. 3, 1945 2 Sheets-Sheet 1

Inventor
T. B. Brown
By Ralph L. Chappell
Attorney

June 2, 1964     T. B. BROWN     3,135,199
MAGNETOMETER

Filed Aug. 3, 1945     2 Sheets-Sheet 2

Inventor
T. B. Brown
By Ralph L. Chappell
Attorney

United States Patent Office 3,135,199
Patented June 2, 1964

3,135,199
MAGNETOMETER
Thomas B. Brown, 2810 23rd St., North Arlington, Va.
Filed Aug. 3, 1945, Ser. No. 608,811
9 Claims. (Cl. 102—19.2)
(Granted under Title 35, U.S. Code (1952), sec. 266)

This invention relates generally to magnetometers and more particularly to a total field magnetometer for measuring the scalar value of an external magnetic field, or selectively for detecting changes therein, as the case may be.

More specifically, the present invention contemplates a total field magnetometer which is adapted to yield a measurable quantity indicative of the total strength or scalar value of an external magnetic field, or selectively of changes therein, such quantity, in each case, being yielded substantially independently of the orientation of the magnetometer within the field, or of movement of the magnetometer within the field in a static or undisturbed condition thereof.

In accordance with the arrangement of the magnetometer of the present invention, three matched electro-magnetic field sensitive elements, each having quadratic or square law response to the component of an external field parallel to the magnetic axis thereof, are arranged with their magnetic axes disposed mutually perpendicular. The elements also are electrically connected such that the individual responses of the elements add to provide a total response which is proportional to the square of the total strength or scalar value of the field, and the total response thus obtained is provided substantially independently of the orientation of the magnetometer with respect to the direction of the field, or of movement of the magnetometer in the undistorted field.

According to a preferred structural embodiment of the invention, each of the sensitive elements is arranged in the form of an inductor having a coil and a magnetic core therefor. Each of the cores is so proportioned with respect to its coil that the inductor comprising them yields an inductance depression which is proportional to the square of the externally applied field component parallel to the magnetic axis of the inductor. This inductance depression is obtained when the external field is superimposed upon a field set up in the core by a sinusoidal exciting current of predetermined value, and is measured at the frequency of the exciting current. This measurement must be made at the frequency of the exciting current for the reason that voltage components of higher frequencies appear across the inductor coil by reason of the variable character of its impedance.

Thus, three matched and electrically connected inductors having their magnetic axes arranged mutually perpendicular each to each other are adapted to yield a total inductance depression which is proportional to the sum of the squares of the three components of an externally applied field or to the square of the absolute magnitude or scalar value of the total field. As will become more fully apparent hereinafter, the magnetometer also is adapted to yield a total inductance depression or change in inductance which is directly proportional to small changes in the scalar value of the field. In such latter case the proportionality factor is itself proportional to the strength of the undisturbed field. In either case, the inductance depression conveniently may be measured or detected by any suitable means such, for example, as an inductance bridge circuit in which the output of the bridge circuit may be amplified, rectified, calibrated and otherwise controlled to provide a quantity indicative of the scalar value of the total field, or selectively of changes therein.

A magnetometer of the aforedescribed character is well adapted for use as a detector in a mine or depth charge firing system of the magnetic induction type in which the mine or depth charge, whichever the case may be, is fired when a predetermined change in the ambient magnetic field is detected, it being well known that the ambient magnetic field is altered or disturbed by the presence nearby of a ponderous mass of ferromagnetic material such, for example, as a vessel or a submarine.

The devices heretofore employed in mines and depth charges for detecting changes in the ambient magnetic field generally have comprised a pair of gradiometer coils or an induction pickup or search coil adapted to respond to variations in the value of the component of the ambient magnetic field parallel to the magnetic axis thereof. Devices of this general character have not been found to be entirely satisfactory in use for the reason that such devices yield spurious quantities or signals as the devices are moved angularly about in the earth's undisturbed or unaltered magnetic field and extreme difficulties are encountered in reducing the spurious signals to a negligible value or signal level. Use of single element detectors such as pickup or search coils is satisfactory only when the position of such devices is relatively fixed in space as in the case, for example, of use in underwater ground mines. However, it is well known that the response of a ground mine is affected by the fortuitous position which the mine assumes with respect to the direction of the earth's magnetic field when the mine comes to rest on the bed of a body of water in which it is planted and also by the fortuitous heading of a vessel moving with respect thereto.

Multiple element detectors such, for example, as the aforesaid gradiometer coils have been devised for the purpose of avoiding the inherent position limitations imposed by the single element detectors. Spurious signals in the use of the gradiometer coils arise primarily as a result of the difficulties experienced in aligning the magnetic axes of the gradiometer coils and electrically balancing the coils such that equal signals are generated thereby as the coils are moved angularly about in the earth's undisturbed magnetic field. The design of gradiometer detectors for the foregoing purpose is such as to require separate assembly of the detector elements in the associated mine or depth charge such that time consuming and tedious balancing, equalizing and aligning operations are required in bringing the separate elements to a condition of electrical and magnetic equality. Gradiometer detectors also have the additional disadvantage that their sensitivities fall off with distance according to an inverse fourth power law, whereas the sensitivity of a component field detector or a total field detector follows an inverse cube law.

The magnetometer of the present invention when employed as a detector for the aforedescribed purposes, possesses substantially all of the advantages of the prior art detectors and avoids the aforedescribed difficulties encountered in the use and the assembly thereof for the reason that the elements of the magnetometer may be matched, balanced and assembled as a unit during manufacture thereof. Moreover, optimum values of proportions of the cores and coils comprising the elements and of the exciting current for the coils may be selected such that the elements together yield a total measurable quantity or signal which is substantially independent of movement of the magnetometer within the field in an undisturbed condition thereof, or of the orientation of the magnetometer with respect to the direction of the field.

It is an object, therefore, of the present invention to provide a new and improved magnetometer adapted to provide a measurable quantity indicative of the scalar value of an external field, or selectively of changes therein.

Another object is to provide a magnetometer adapted to provide a measurable quantity indicative of the scalar value of an external field, or selectively of changes therein, in which the quantity measured is substantially independent of the orientation of the magnetometer with respect to the direction of the field or movement of the magnetometer within the field.

Another object is to provide a multi-element total field magnetometer whose elements may be matched, assembled and balanced as a unit during manufacture thereof.

Another object is to provide a multi-element total field magnetometer in which each of the elements is adapted to yield a measurable quantity proportional to the square of the field component parallel to the magnetic axis thereof and in which the individual quantities may be added to yield a total quantity which is proportional to the square of the total strength or scalar value of the field.

Another object is to provide a field sensitive element having quadratic response to the component of an external magnetic field parallel to the magnetic axis thereof.

An additional object is to provide an inductor adapted to yield an inductance depression which is proportional to the square of the component of an external field parallel to the magnetic axis thereof.

Still other objects, advantages and features of the present invention are those inherent in or implied from the novel construction, combination and arrangement of parts as will become more fully apparent as the description proceeds, reference being had to the accompanying drawings in which.

Figure 1:
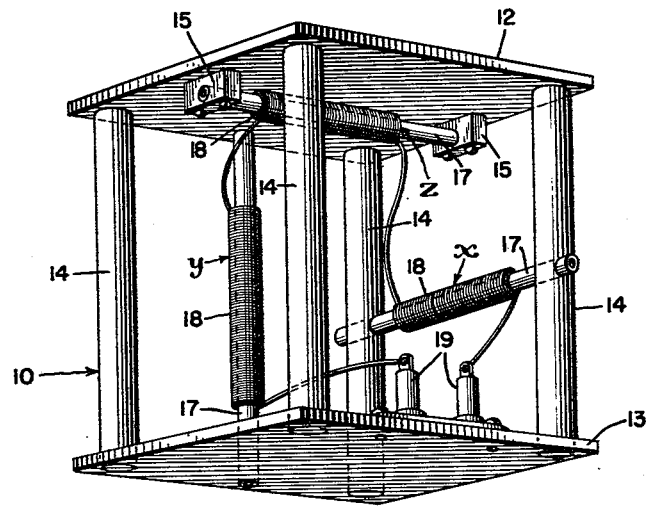
FIG. 1 is a perspective view of a multi-element total field magnetometer arranged in accordance with a preferred embodiment of the invention.

Referring now to the drawings for a more complete understanding of the invention and more particularly to FIG. 1 thereof, the numeral 10 generally designates a magnetometer or composite inductor which comprises three matched inductors $x$, $y$ and $z$ whose magnetic axes are arranged mutually perpendicular each to each other and whose coils are electrically connected in series in accordance with the principle of the invention. It has been found that optimum quadratic response of the composite inductor may be obtained when the individual inductors are arranged in predetermined spaced relation such that the mutual inductance therebetween is reduced to a minimum and the magnetic axes of the inductors are disposed perpendicular each to each other with the greatest exactness physically possible. A suitable arrangement which fulfills these conditions is shown in FIG. 1.

The inductors may be supported in any convenient manner adapted to provide the required spaced relation therebetween. In the arrangement shown, the mounting structure comprises a pair of plates 12 and 13 which are maintained in fixed spaced relation by means of suitable posts 14. In this arrangement, inductor $y$ is interposed between the plates in the same manner as posts 14, inductor $x$ is supported between a pair of posts which lie within the same plane therewith and inductor $z$ is mounted along the face of plate 12 by means of suitable supports 15 therefor which may be secured to plate 12 by any convenient means. It will be understood, however, that the aforedescribed mounting structure, or any other mounting structure suitable for the purpose, necessarily must be formed of non-magnetic and non-conducting material.

Figure 2:
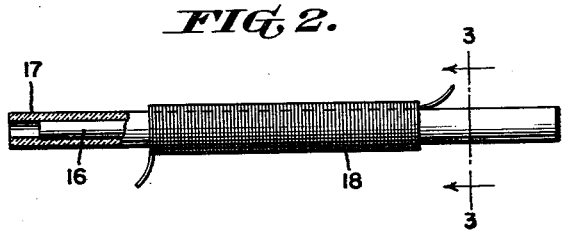
FIG. 2 is a view in elevation of one of the magnetometer elements with certain parts thereof being broken away to show certain details of construction.
Figure 3:
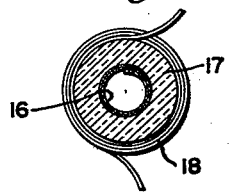
FIG. 3 is a sectional view of the magnetometer element as seen along the line 3—3 of FIG. 2.

Referring now to FIGS. 2 and 3, it will be seen that each of inductors $x$, $y$ and $z$ comprises a core 16 which is preferably formed of a scroll-rolled strip or sheet of a suitable magnetic material having high permeability for small changes in weak fields such, for example, as a material known in the art by the trade name of Permalloy. The core is inserted into a tube 17 adapted to provide mechanical protection therefor and adapted to serve as a coil winding form to receive a coil 18 thereon. The tube may be formed of any non-magnetic and non-conducting material suitable for the purpose such, for example, as the material known in the art by the trade name of Sillimanite. Coil 18 is formed with an optimum length determined by the dimensions of the core for a reason more fully to appear hereinafter.

Coils 18 of inductors $x$, $y$ and $z$ are connected in series electrically and the free ends of the series combination are secured to suitable terminals 19 which in turn are suitably secured to plate 13, thus providing composite inductor 10.

It has been discovered that an inductor of the aforedescribed construction yields an inductance depression or change in inductance which is proportional to the square of an external field component parallel to the magnetic axis of the inductor when the external field is superimposed upon the field set up in the core of the inductor by a sinusoidal exciting current of such value as to drive the core into an optimum region of the B-H curve of the core material, the inductance depression being measured with respect to the fundamental or first harmonic frequency component of the exciting current. Thus, when the composite inductor 10 is similarly excited and is disposed within an external field whose scalar value is to be measured, the composite inductor yields an inductance depression which is proportional to the square of the magnitude of the total strength or scalar value of the field to an exactness which is dependent only upon the exactness to which the individual inductors are matched, the exactness to which the individual inductors are arranged with their magnetic axis mutually perpendicular and the exactness to which the individual inductors provide quadratic response to the external field component parallel to the magnetic axis thereof. It has been found that the range from zero value of an external field over which quadratic response may be obtained may be extended to cover the whole range of values for the earth's magnetic field. Moreover, when the foregoing optimum values are closely observed, the magnetometer may be moved about in an undisturbed external field without producing an appreciable spurious inductance depression indicative of an apparent change in the field.

The foregoing proportionality may be expressed by the following equations in which the equation expressing the inductance depression for inductor $x$ may be written:

(1)  $$Lx_0 - Lx = KxHx^2$$

where $Lx_0$ is the inductance value of inductor $x$ for zero external field;

$Lx$ is the inductance value of inductor $x$ for external field strength $Hx$;

$Kx$ is the proportionality factor for inductor $x$; and $Hx$ is the strength of the external field component parallel to the magnetic axis of coil $x$.

Similarly, the equations expressing the inductance depressions of inductors $y$ and $z$ may be written:

(2)  $$Ly_0 - Ly = KyHy^2$$

(3)  $$Lz_0 - Lz = KzHz^2$$

The sum of Equations 1, 2 and 3 gives the following equation:

(4)  $$Lx_0 + Ly_0 + Lz_0 - Lx - Ly - Lz = KxHx^2 + KyHy^2 + KzHz^2$$

Since inductors $x$, $y$ and $z$ are matched and are excited by the same value of sinusoidal exciting current, (5)  $$Lx_0 = Ly_0 = Lz_0$$

and (6)  $$L_0 = Lx_0 + Ly_0 + Lz_0$$

where $L_0$ is the total initial inductance of the composite inductor for zero external field.

Also by reason of matching of the cores, (7)  $$Kx = Ky = Kz = K$$

where K is the proportionality factor for the composite inductor.

Since the magnetic axes of inductors $x$, $y$ and $z$ are mutually perpendicular each to each other, (8)  $$H^2 = Hx^2 + Hy^2 + Hz^2$$

where H is the strength of the total field or scalar value of the external field.

Since the coils of inductors $x$, $y$ and $z$ are connected in series, (9)  $$L = Lx + Ly + Lz$$

where L is the total inductance value of the composite inductor for external field H.

Substituting $L_0$, L, K and H for their equivalents in Equation 4, the following equations are obtained:

(10) $L_0 - L = KH^2 = \Delta L$ the inductance depression

(11)  $$L = L_0 - KH^2$$

Thus, from Equation 10 it is seen that the change in inductance, or inductance depression, from an initial value in zero external field is proportional to the square of the scalar value of an externally applied field H. Differentiating Equation 11 gives equation

(12)  $$dL = -2KHdH$$

from which it will also be seen that small changes $dL$ in the value of inductance L are directly proportional to the strength of the external field H and to small changes $dH$ therein.

Figure 7:
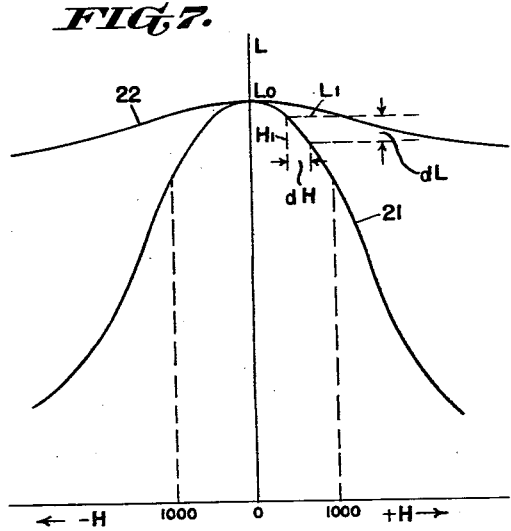
FIG. 7 is a diagram illustrating the relation between incremental changes in inductance and corresponding incremental changes in external fields.
Figure 8:
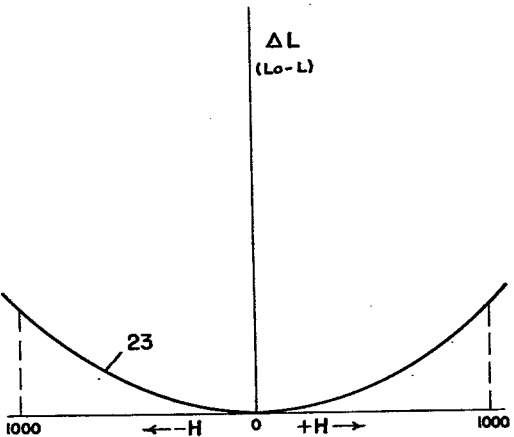
FIG. 8 is a diagram illustrating the relation between inductance depression and the strength of the external field producing the inductance depression.

Referring now to FIGS. 7 and 8 in which the foregoing proportionality is illustrated diagrammatically for external field strength values covering the entire range of the earth's magnetic field as measured in milligauss, the numeral 21 designates the response curve for the composite inductor 10 which corresponds to the aforestated Equation 11 and illustrates the variation of inductance L from initial value $L_0$ as an external field of either polarity is increased from zero value thereof. Curve 21 also illustrates the differential decrease $dL$ from inductance value L1 in response to a differential increase $dH$ of the external field above the value H1 thereof. It will be noted that greater changes in L are produced when the change occurs from the larger values of H, the differential value $dL$ being directly proportional to the value of H at which the change in the field occurs, as readily seen from Equation 12. Thus, it readily will be appreciated that the sensitivity of the composite inductor, when employed to detect changes in the value of an external field, may be greatly increased when the detector is employed in fields of relatively great value, a mine or depth charge employing the detector, for example, being most sensitive when used in regions of the earth in which the scalar value of the earth's magnetic field is within the upper portion of the full range of values thereof.

Curve 22 is a response curve for an inductor having a soft iron core, for example, and illustrates by way of comparison with curve 21 the relatively greater sensitivity which may be obtained in the use of Permalloy core inductors.

Curve 23, FIG. 8, illustrates the quadratic variation in the inductance depression $\Delta L$ in response to the increase of an external field or either polarity from zero value to positive and negative values of H covering the entire range of the earth's magnetic field, this curve corresponding to Equation 10 set forth hereinbefore.

Figure 4:
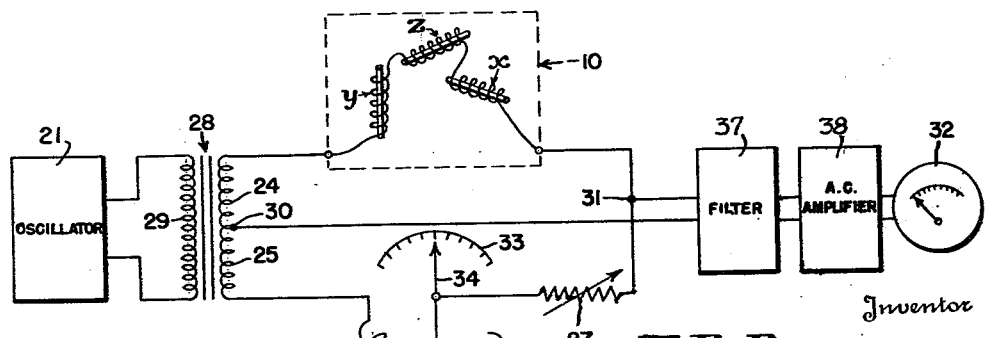
FIG. 4 is a diagrammatic view of a complete circuit including the magnetometer of the present invention and suitable for use in measuring the scalar value of external fields.

Referring now to FIG. 4 in which the magnetometer 10 is employed with associated apparatus for measuring the scalar value of external fields, or selectively of changes therein, it will be seen that the magnetometer comprises one leg of an inductance bridge having matched secondary transformer windings 24 and 25 and a calibrated variable inductance 26 which comprise the remaining legs of the bridge. The bridge also includes a variable resistance 27 which may be adjusted at will to balance the resistance of magnetometer 10.

The bridge is excited by a pure sinusoidal current of the aforestated optimum value adapted to drive the inductors into the desired region of the B-H curves therefor and having a suitable frequency such, for example, as a frequency in the order of one thousand cycles per second. The exciting current may be supplied by any suitable source which includes means for adjusting the strength of the current such, for example, as a continuous-wave Hartley oscillator 21 which conveniently may be coupled to the bridge by means of transformer 28 having a primary winding 29 and including the aforesaid secondary windings 24 and 25.

The output of the bridge, which appears between points 30 and 31 therein when the inductances of magnetometer 10 and variable inductance 26 are unbalanced, is applied to filter 37 to remove all components of frequencies other than that of the exciting current, and the filtered output thereafter is amplified sufficiently by amplifier 38 to actuate a suitable meter 32.

In the use of the circuit of FIG. 4, the magnetometer 10 is disposed in the external field to be measured and, in accordance with one method of measurement, variable inductor 26 is adjusted until meter 32 reads zero and the scalar value of the field thereafter is read from the scale 33, the scale and indicator 34 therefor being operatively arranged with inductor 26 and calibrated by placing the magnetometer in external fields of known value.

In accordance with another method of measurement, the bridge may be balanced in zero external field by adjustment of inductor 26 or by selection of an inductor of fixed value. In such case, meter 32 produces a deflection in response to an external field and the meter may be calibrated so as to give a measure of the scalar value of the field. This latter method may be employed for detecting changes in the external field from some selected value thereof other than zero. For this purpose, the bridge may be balanced at the selected value of the field and changes or departures of the field from such value indicated by meter 32.

Figure 5:
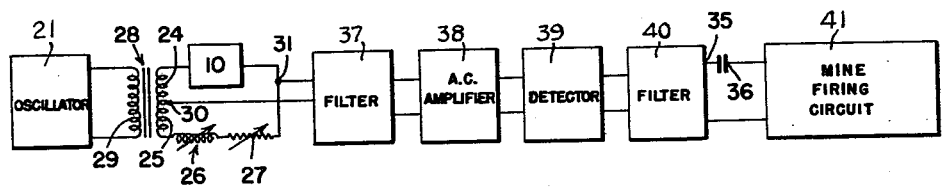
FIG. 5 is a diagrammatic view of a complete mine firing control system including the magnetometer of the present invention.

Referring now to FIG. 5 in which the circuit of FIG. 4 is employed in an underwater mine firing system, it will be seen that the output of the amplifier which actuates meter 32 in FIG. 4 is rectified by the detector 39 in FIG. 5 and thereafter filtered by filter 40 to provide at 35 a D.C. voltage, or no-signal voltage, which appears in response to unbalance of the bridge by the scalar value of the earth's magnetic field in the region of the earth in which the mine is planted, the bridge, for this purpose, first being balanced for zero external field.

Condenser 36 couples the filter output to a mine firing circuit 41 and serves as a means for discriminating against very slow changes in the D.C. potential at 35 whereby substantially no voltage appears across the input terminals of the mine firing circuit in response to such changes. However, when a transient change in the scalar value of the ambient magnetic field is produced by a vessel moving within the vicinity of the mine, the consequent transient change in the D.C. voltage at 35 passes through condenser 36 so as to produce across the terminals of the mine firing circuit a voltage of sufficient magnitude to operate the firing circuit and fire the mine beneath a vulnerable portion of the vessel.

Figure 6:
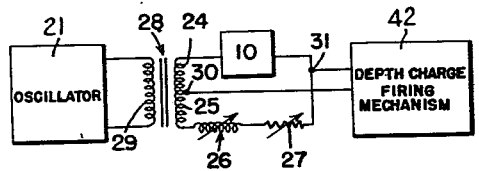
FIG. 6 is a diagrammatic view of a complete depth charge firing control system including the magnetometer of the present invention.

FIG. 6 illustrates diagrammatically a depth charge firing system which may be generally similar to the mine firing system of FIG. 5. The depth charge firing mechanism 42, however, includes control and firing circuits which preferably are of known type.

From the foregoing it should now be apparent that a magnetometer has been provided which is well adapted to fulfill the aforestated objects of the invention. Moreover, while a specific embodiment of the magnetometer and certain specific applications therefor have been described in particularity, it will be apparent to those skilled in the art to which the invention appertains, after understanding the invention, that the same is susceptible of additional embodiments and adaptations without departing from the spirit and scope of the invention as defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. A total field magnetometer of the character disclosed comprising, in combination, three matched and series connected magnetometer elements disposed mutually perpendicular each to each other, each of said elements having quadratic response to the component of an external magnetic field parallel to the magnetic axis thereof such that the individual responses of the elements add linearly to give a total response substantially proportional to the square of the total strength or scalar value of the external field.

2. In a total field measuring circuit of the character disclosed, the combination of a total field magnetometer adapted to yield a quantity whose magnitude is determined by the scalar value of an external magnetic field or selectively of a small change therein, an exciting current source, a transformer having matched secondary windings connected to said current source, an inductance bridge circuit for producing a signal in accordance with the magnitude of said quantity, said magnetometer comprising one leg of said bridge circuit and said matched secondary windings, and a calibrated variable inductance comprising the other legs of said bridge circuit, whereby said calibrated variable inductance is controlled by said signal for indicating the value of the field or selectively of said change therein.

3. In a total field measuring circuit of the character disclosed, the combination of a total field magnetometer detector adapted to yield a quantity whose magnitude is determined by the scalar value of an external magnetic field or selectively of a small change therein, a source of exciting current, a transformer coupling means having matched secondary windings connected to said source, a bridge circuit including said detector for producing a signal in accordance with the magnitude of said quantity, variable inductance means comprising the remaining leg of said bridge circuit settable at will for balancing the bridge circuit so as to reduce said signal to zero, and calibrated means controlled by said balancing means for indicating the value of the field or selectively of said change therein when the bridge is balanced.

4. A total field firing control system adapted to detect a vessel moving relatively with respect thereto and to operate a firing circuit as the vessel is detected comprising, in combination, a total field magnetometer detector comprising a plurality of matched inductors adapted to yield an inductance depression substantially proportional to the square of the scalar value of the ambient magnetic field caused by the vessel moving relatively with respect thereto, said inductance depression being yielded substantially independently of the direction of the field, a circuit for producing a signal variably in accordance with variations in said inductance depression, and a circuit controlled by said signal for operating said firing circuit when the signal reaches a predetermined value.

5. An apparatus for measuring the strength of a total direct magnetic field comprising three cores of ferromagnetic material, the principal axes whereof are mutually perpendicular, a plurality of serially connected coils respectively surrounding said cores, a source of alternating current connected to said coils whereby an alternating field is induced in each of the cores to establish an initial inductance value for the coil corresponding to the strength of the alternating current flowing therethrough in the absence of any direct field to be measured, and circuit means for measuring the total change in inductance of said three coils due to superposition of the direct field to be measured upon the induced alternating fields.

6. The combination in accordance with claim 5 wherein said source of alternating current includes means for adjusting the strength of said current to a particular value whereby the change of inductance of each coil may be made proportional to the square of the superposed direct field component acting thereon.

7. An apparatus for measuring the strength of a direct magnetic field comprising a core of ferro-magnetic material, a coil surrounding the core, a source of alternating current connected to the coil whereby an alternating field is induced in the core to establish an initial inductance value for the coil corresponding to the strength of the said current in the absence of the direct field to be measured, said core and coil being so proportioned that the coil yields an inductance depression substantially proportional to the square of the component of the direct field parallel to the magnetic axis of the coil, and means comprising an alternating current bridge network for measuring the change in inductance due to supraposition of said direct field to be measured upon the induced alternating field.

8. An apparatus for measuring the strength of a direct magnetic field comprising a core of magnetic material, a coil surrounding the core, a source of alternating current connected to an alternating current bridge network and connected to said coil whereby an alternating field is induced in the core to establish an initial inductance value for the coil corresponding to the strength of said current in the absence of the direct field to be measured, said core and coil being so proportioned that the coil yields an inductance depression substantially proportional to the square of the component of the direct field parallel to the magnetic axis of the coil, and means comprising said alternating current bridge network for measuring the change in inductance due to supraposition of said direct field to be measured upon the induced alternating field.

9. An apparatus for measuring the strength of the magnetic field comprising a core of ferro-magnetic material, a coil surrounding the core, a source of alternating current connected to the coil whereby an alternating field is induced in the core to establish an initial inductance value for the coil corresponding to the strength of said current in the absence of the direct field to be measured, said core and coil being so proportioned that the coil yields an inductance depression substantially proportional to the square of the component of the direct field parallel to the magnetic axis of the coil, and means for measuring the change in inductance due to the superposition of said direct field to be measured upon the induced alternating field, said source of alternating current including means for adjusting the strength of said current to a particular value whereby the change of inductance of said coil may be made proportional to the square of the superposed direct field.

References Cited in the file of this patent
UNITED STATES PATENTS

| | | |
|---|---|---|
| 1,665,397 | Wunsch | Apr. 10, 1928 |
| 2,241,499 | Barth | May 13, 1941 |
| 2,252,059 | Barth | Aug. 12, 1941 |
| 2,374,166 | Beach et al. | Apr. 24, 1945 |
| 2,379,716 | Hull | July 3, 1945 |
| 2,390,051 | Barth | Dec. 4, 1945 |
| 2,403,347 | Depp et al. | July 2, 1946 |
| 2,412,046 | Hoare | Dec. 3, 1946 |
| 2,427,666 | Felch et al. | Sept. 23, 1947 |
| 2,436,394 | Maltby et al. | Feb. 24, 1948 |
| 2,438,964 | Cunningham et al. | Apr. 6, 1948 |
| 2,477,337 | Kahl | July 26, 1949 |
| 2,485,931 | Slonczewski | Oct. 25, 1949 |